(12) United States Patent
Bai (10) Patent No.: US 10,992,723 B2
(45) Date of Patent: Apr. 27, 2021

(54) METHOD FOR PROCESSING STREAMING MEDIA DATA AND TERMINAL

(71) Applicant: Guangdong Oppo Mobile Telecommunications Corp., Ltd., Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/536,857

(22) Filed: Aug. 9, 2019

(65) Prior Publication Data

US 2019/0364079 A1  Nov. 28, 2019

Related U.S. Application Data (63) Continuation of application No. PCT/CN2017/120285, filed on Dec. 29, 2017.

(30) Foreign Application Priority Data

Feb. 9, 2017 (CN) .......................... 201710071948.X (51) Int. Cl.
  *H04L 29/06* (2006.01)
  *H04L 29/08* (2006.01)
(52) U.S. Cl.
  CPC .......... *H04L 65/60* (2013.01); *H04L 65/4023* (2013.01); *H04L 67/2842* (2013.01)

(58) Field of Classification Search
  CPC . H04L 65/4023; H04L 65/60; H04L 67/2842; H04L 67/2847; H04L 29/0881
  See application file for complete search history.

(56) References Cited

U.S. PATENT DOCUMENTS

| 10,341,701 B2 * | 7/2019 | Hirsch | ............. H04N 21/44016 |
| 10,740,392 B2 * | 8/2020 | McDevitt | ............ H04L 65/4069 |
| 2010/0100899 A1 * | 4/2010 | Bradbury | ........... H04L 65/4092 725/29 |

(Continued)

FOREIGN PATENT DOCUMENTS

| CN | 101001362 A | 7/2007 |
| CN | 101075952 A | 11/2007 |

(Continued)

OTHER PUBLICATIONS

Amazon, "Watch Amazon Videos Offline with On Deck", Jul. 2, 2016 (Year: 2016).*

(Continued)

*Primary Examiner* — Jerry B Dennison (57) ABSTRACT

Provided are a method for processing streaming media data and a terminal. The method includes the following. Determine whether streaming media data to be downloaded satisfies a pre-download condition when the streaming media data to be downloaded is detected. Download the streaming media data to be downloaded, based on a determination that the streaming media data to be downloaded satisfies the pre-download condition. Play streaming media data downloaded in a playing environment of the streaming media data, upon detecting the playing environment.

20 Claims, 5 Drawing Sheets

---

Determining whether streaming media data to be downloaded satisfies a pre-download condition, when the streaming media data to be downloaded is detected — 101

Downloading the streaming media data to be downloaded, based on a determination that the streaming media data to be downloaded satisfies the pre-download condition — 102

Playing the streaming media data downloaded in a playing environment of the streaming media data, when the playing environment is detected — 103

(56) References Cited

U.S. PATENT DOCUMENTS

| | | | | |
|---|---|---|---|---|
| 2012/0151539 | A1* | 6/2012 | Funge | H04N 21/23406 725/109 |
| 2015/0100666 | A1* | 4/2015 | Harrang | H04L 65/80 709/217 |
| 2016/0065637 | A1* | 3/2016 | O'Malley | H04L 67/22 709/231 |
| 2016/0294894 | A1* | 10/2016 | Miller | G06F 16/24578 |
| 2017/0289213 | A1* | 10/2017 | Chen | H04L 65/4084 |
| 2017/0359435 | A1* | 12/2017 | Alsina | H04N 21/4335 |
| 2019/0364079 | A1* | 11/2019 | Bai | H04L 65/4023 |
| 2020/0401622 | A1* | 12/2020 | McDevitt | G06F 16/735 |

FOREIGN PATENT DOCUMENTS

| | | |
|---|---|---|
| CN | 101184021 A | 5/2008 |
| CN | 101951505 A | 1/2011 |
| CN | 102196301 A | 9/2011 |
| CN | 102387409 A | 3/2012 |
| CN | 102843614 A | 12/2012 |
| CN | 103618942 A | 3/2014 |
| CN | 103731721 A | 4/2014 |
| CN | 102790925 B | 4/2015 |
| CN | 104618418 A | 5/2015 |
| CN | 104837056 A | 8/2015 |
| CN | 105187543 A | 12/2015 |
| CN | 105228028 A | 1/2016 |
| CN | 105450758 A | 3/2016 |
| CN | 106028157 A | 10/2016 |
| CN | 106165439 A | 11/2016 |
| WO | 2014129747 A1 | 8/2014 |
| WO | 2015051321 A1 | 4/2015 |

OTHER PUBLICATIONS

Extended European search report issued in corresponding European application No. 17895867.4 dated Aug. 16, 2019.

International search report issued in corresponding international application No. PCT/CN2017/120285 dated Apr. 2, 2018.

First Examination Report issued in corresponding IN application No. 201917033452 dated Dec. 18, 2020.

\* cited by examiner

METHOD FOR PROCESSING STREAMING MEDIA DATA AND TERMINAL

CROSS-REFERENCE TO RELATED APPLICATION(S)

This application is a continuation of International Application No. PCT/CN2017/120285, filed on Dec. 29, 2017, which claims priority to Chinese Patent Application No. 201710071948.X, filed on Feb. 9, 2017, the disclosures of both of which are hereby incorporated by reference in their entireties.

TECHNICAL FIELD

This disclosure relates to the technical field of streaming media, and more particularly to a method for processing streaming media data and a terminal.

BACKGROUND

With the development of streaming media technology, terminals such as mobile terminals are able to play streaming media data online. Currently, upon detecting existence of streaming media data to be downloaded, a terminal can download the streaming media data to be downloaded only after receiving from a user an operation for triggering playing and play streaming media data downloaded only after download of the streaming media data to be downloaded is completed. If a download process is affected by the network environment, for example, the network signal is poor, a download speed of the streaming media data to be downloaded may be affected, which prolongs download time of the streaming media data to be downloaded and thus makes the streaming media data unable to be played in time, thereby providing poor experience for users.

SUMMARY

In implementations of the disclosure, a method for processing streaming media data and a terminal are provided, which can pre-download the streaming media data before playing, thereby ensuring that the streaming media data can be smoothly played in time.

According to a first aspect of the disclosure, a method for processing streaming media data is provided. The method includes the following. Upon detecting existence of the streaming media data to be downloaded, whether streaming media data to be downloaded satisfies a pre-download condition is determined. The streaming media data to be downloaded is downloaded, based on a determination that the streaming media data to be downloaded satisfies the pre-download condition. Play streaming media data downloaded in a playing environment of the streaming media data, upon detecting the playing environment.

According to a second aspect of the disclosure, a terminal is provided. The terminal includes a processor, a bus, and a processor. The memory is configured to store executable program codes and coupled with the processor via the bus. The executable program codes, when executed, are operable with the processor to: determine whether streaming media data to be downloaded satisfies a pre-download condition, upon detecting existence of the streaming media data to be downloaded; download the streaming media data to be downloaded based on a determination that the streaming media data to be downloaded satisfies the pre-download condition; play streaming media data downloaded in a playing environment of the streaming media data, upon detecting the playing environment.

According to a third aspect of the disclosure, a non-transitory computer readable storage medium for storing executable program codes is provided. The executable program codes, when executed, are operable with a processor to: determine whether streaming media data to be downloaded satisfies a pre-download condition, upon detecting existence of the streaming media data to be downloaded; download the streaming media data to be downloaded based on a determination that the streaming media data to be downloaded satisfies the pre-download condition; play streaming media data downloaded in a playing environment of the streaming media data, upon detecting the playing environment.

BRIEF DESCRIPTION OF THE DRAWINGS

To describe the technical solutions of the implementations of the disclosure or the related art more clearly, the following will give a brief description of accompanying drawings used for describing the implementations of the disclosure or the related art. Apparently, the accompanying drawings described in the following are merely some implementations of the disclosure. Those of ordinary skill in the art can also obtain other accompanying drawings based on the accompanying drawings described below without creative efforts.

DETAILED DESCRIPTION

Hereinafter, technical solutions embodied in implementations of the disclosure will be described in a clear and comprehensive manner in conjunction with the accompanying drawings. It is evident that the implementations described herein are merely some rather than all of the implementations of the disclosure. All other implementations obtained by those of ordinary skill in the art based on the implementations of the disclosure without creative efforts shall fall within the protection scope of the disclosure.

The following will describe the technical solutions of the disclosure in detail in conjunction with the accompanying drawings and the implementations.

A method for processing streaming media data is provided. In this method, upon detecting existence of the streaming media data to be downloaded, whether streaming media data to be downloaded satisfies a pre-download condition is determined. The streaming media data to be downloaded is then downloaded, if the streaming media data to be downloaded satisfies the pre-download condition. Play streaming media data downloaded in a playing environment of the streaming media data, upon detecting the playing environment. This method will be depicted in detail with reference to the accompany drawings in the following.

Figure 1:
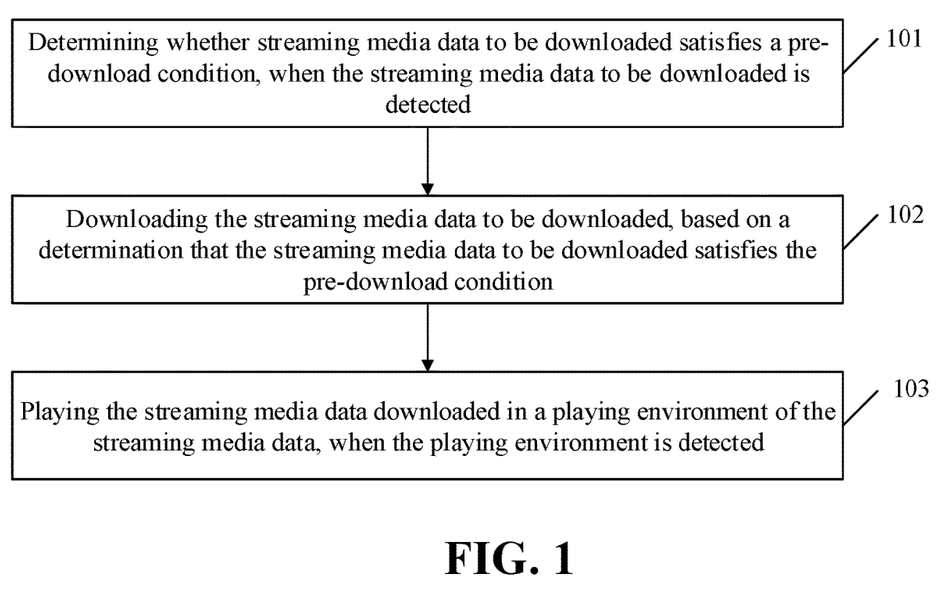
FIG. 1 is a schematic flowchart illustrating a method for processing streaming media data according to a first implementation of the disclosure.

FIG. 1 is a schematic flowchart illustrating a method for processing streaming media data according to a first implementation of the disclosure. The method can be implemented by a terminal. As illustrated in FIG. 1, the method starts at block 101.

At block 101, determine whether streaming media data to be downloaded satisfies a pre-download condition, when the streaming media data to be downloaded is detected.

In implementations of the disclosure, when the terminal detects the streaming media data to be downloaded, whether the streaming media data to be downloaded satisfies the pre-download condition is determined. In particular, the terminal may detect the streaming media data to be downloaded according to messages pushed by a playing source of streaming media (such as a streaming media playing software), or may detect the streaming media data to be downloaded after a streaming media playing software is launched, or may detect the streaming media data to be downloaded on a currently displayed page. Specifically, the terminal can determine the playing source or playing contents of the streaming media data to be downloaded, through descriptive information received on the streaming media data to be downloaded. Upon detecting existence of the streaming media data to be downloaded, the terminal may further determine whether the streaming media data to be downloaded satisfies the pre-download condition. For example, the terminal may determine whether the amount of data of the streaming media data to be downloaded is less than a preset threshold, or whether the playing source of the streaming media data to be downloaded is a preset playing source (such as a streaming media playing software or a preset specific application, etc.) of the terminal, or whether a type of the streaming media data to be downloaded is a preset type, or whether streaming media contents of the streaming media data to be downloaded are user subscribed contents or user accustomed contents (playing contents that the user usually watches) which are determined by the terminal. Implementations of the disclosure may also involve other pre-download conditions, which are not enumerated herein.

At block 102, download the streaming media data to be downloaded, based on a determination that the streaming media data to be downloaded satisfies the pre-download condition.

In one example, if the terminal determines that the streaming media data to be downloaded satisfies the pre-download condition, the streaming media data to be downloaded is downloaded to a memory space of the terminal. When the terminal needs to play streaming media data downloaded, the streaming media data downloaded can be directly read out from the memory space, thereby saving download time.

For example, the terminal can download the streaming media data to be downloaded to a preset cache area of the memory space, so as to ensure that the terminal can play the streaming media data downloaded at a faster speed and more smoothly. In response to detecting that the streaming media data downloaded is played, the terminal may clear other streaming media data from the preset cache area, or may clean up unplayed streaming media data in the preset cache area periodically.

In addition, within a preset time period, the terminal may detect whether there is a playing environment of the streaming media data downloaded or detect existence of an operation for triggering playing ("playing-trigger operation" for short) against the streaming media data downloaded. If no playing environment or no playing-trigger operation is detected, the streaming media data downloaded may be cleared up and the pre-download condition can be further adjusted.

From another perspective, the playing-trigger operation can be treated as one kind of playing environment. Once a playing-trigger operation against the streaming media data downloaded is received, it can be deemed that a playing environment is available for the streaming media data downloaded.

At block 103, play the streaming media data downloaded in the playing environment of the streaming media data, when the playing environment is detected.

In one example, when the terminal detects the playing environment of the streaming media data downloaded, the streaming media data downloaded can be played in the playing environment without waiting for the playing-trigger operation from the user against the streaming media data downloaded to be detected. In particular, the stored streaming media data downloaded can be retrieved from the memory space of the terminal. The playing environment of the streaming media data includes but is not limited to: a scenario in which a playing window of the streaming media data is displayed on a currently displayed page of the terminal, regardless of whether the playing-trigger operation against the streaming media data is detected; or a scenario in which a playing-trigger operation against the streaming media data is detected by the terminal; or a scenario in which a playing page of the streaming media data is displayed on the terminal, or the like.

It can be concluded that, when the streaming media data to be downloaded is detected, whether the streaming media data to be downloaded satisfies the pre-download condition is determined. Upon determining that the pre-download condition is satisfied, the streaming media data to be downloaded is downloaded. Play the streaming media data downloaded in the playing environment of the streaming media data downloaded when the playing environment is detected. In this way, the streaming media data to be downloaded can be pre-downloaded before playing, which can ensure that the streaming media data downloaded can be smoothly played in time.

Figure 2:
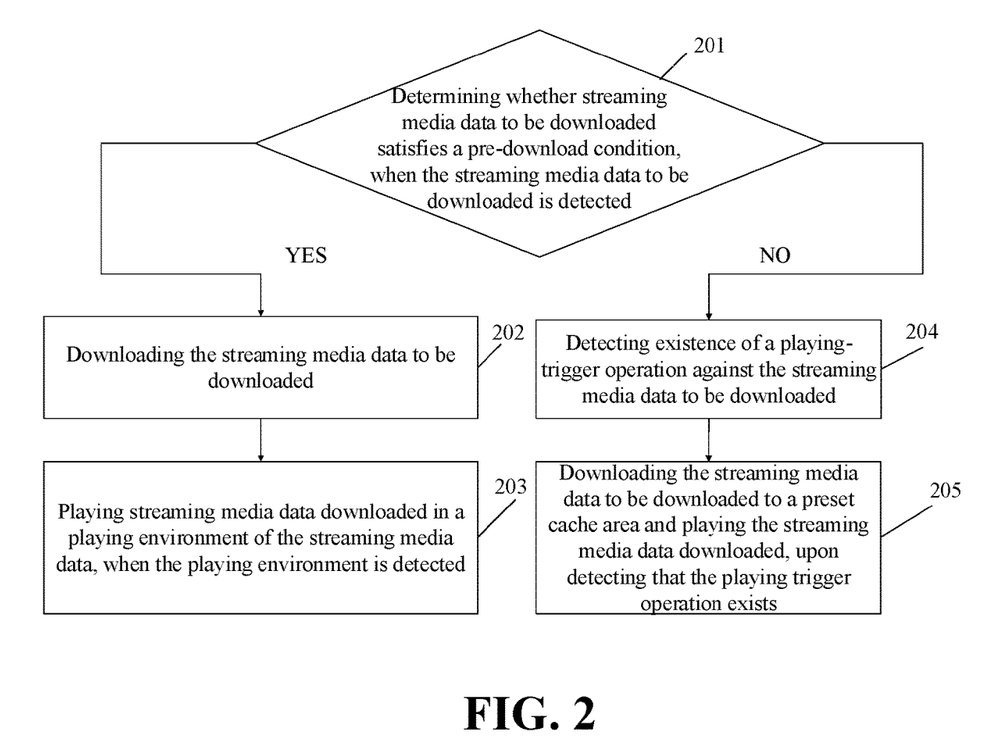
FIG. 2 is a schematic flowchart illustrating a method for processing streaming media data according to a second implementation of the disclosure.

FIG. 2 is a schematic flowchart illustrating a method for processing streaming media data according to a second implementation of the disclosure. The method can be implemented by a terminal. As illustrated in FIG. 2, the method begins at block 201.

At block 201, determine whether streaming media data to be downloaded satisfies a pre-download condition, when the streaming media data to be downloaded is detected, which is similar to operations at block 101.

In one implementation, the pre-download condition set by the terminal may be, but is not limited to, one or more of the following.

(1) If a playing source of the streaming media data to be downloaded is a preset playing source, it is determined that the streaming media data to be downloaded satisfies the pre-download condition. For example, the terminal can determine the playing source of the streaming media data to be downloaded according to descriptive information on the streaming media data to be downloaded. The descriptive information may be information pushed by the playing source, which includes the playing source of the streaming media data to be downloaded, for instance, software for playing the streaming media data pushes the descriptive information on the streaming media data to be downloaded to the terminal; for instance, a video application software pushing information on a movie to the user of the terminal can be treated as the playing resource for playing the movie. Alternatively, the descriptive information may be descriptive information for describing contents of the streaming media data on a playing page of the streaming media data and thus may also include the playing source of the streaming media data to be downloaded. For another example, the terminal can directly determine launched software for playing the streaming media data as the playing source of the streaming media data to be downloaded. The terminal can preset a playing source that can satisfy the pre-download condition. For example, the terminal may determine a streaming media playing software launched by a user more than a preset number of times as the preset playing source. For another example, the terminal may determine a streaming media playing software whose online playing duration exceeds a preset threshold as the preset playing source. For another example, the terminal may determine a streaming media playing software, which contains user subscribed contents as the preset playing source. For another example, the terminal may determine some applications of which the number of times of download and playing or the playing ratio of the streaming media data exceeds a preset threshold as the preset playing sources, such as network social software, chat software, etc. with which the user accepts video data from other users each time, and thus such software may be determined as the preset playing source. It should be noted that, when the streaming media playing software (such as video playing software) currently launched by the user is the preset playing source, which video playing data in the streaming media playing software is the streaming media data to be downloaded can also be determined in other manners, and which of the streaming media data to be downloaded satisfies the pre-download condition can be further determined in other manners. For example, the terminal determines whether the streaming media data to be downloaded has updated contents, after the terminal determines the user subscribed streaming media data in the streaming media playing software as the streaming media data to be downloaded. Upon determining that the streaming media data to be downloaded has updated contents, the terminal determines that the streaming media data to be downloaded satisfies the pre-download condition.

(2) Streaming media contents of the streaming media data to be downloaded belong to preset contents. In particular, according to the descriptive information on the streaming media data to be downloaded, whether the streaming media contents of the streaming media data to be downloaded belong to the preset contents is determined. According to implementations of the disclosure, the preset contents may include user subscribed streaming media contents, or user accustomed streaming media contents (these two can be determined by the terminal). That is, the terminal launches a memory space for caching streaming media files and monitors periodically streaming media types watched by the user. Furthermore, the preset contents may further include streaming media contents determined by the user. For example, the preset contents may be a program or content name determined, or a content type determined (such as TV series, a movie, and a variety show, etc.). Therefore, it may be determined that the streaming media contents of the streaming media data to be downloaded belong to the program or the content name, or the content type according to the descriptive information, which is not limited herein.

In addition, the pre-download condition may be determined in other manners. For example, the pre-download condition determined is that the amount of data of the streaming media data to be downloaded is less than a preset threshold, or a type of the streaming media data to be downloaded is a preset type, and the like. Here, the type of the streaming media data may include a data format type or a content type of the streaming media data. The above types of the pre-download condition may also be combined with each other in multiple manners. For example, if the streaming media playing software launched by the user is the preset playing source, determine whether the user subscribed streaming media contents are updated, and further determine that the streaming media data to be downloaded containing the updated contents satisfies the pre-download condition upon determining that the user subscribed streaming media contents are updated.

At block 202, download the streaming media data to be downloaded if the streaming media data to be downloaded satisfies the pre-download condition.

At block 203, play streaming media data downloaded in a playing environment of the streaming media data, when the playing environment is detected.

For operations at block 202 to block 203, reference may be made to corresponding operations in the implementations illustrated in FIG. 1, and details are not described herein again.

At block 204, detect existence of a playing-trigger operation against the streaming media data to be downloaded, if the streaming media data to be downloaded does not satisfy the pre-download condition.

In one implementation, if the terminal determines that the streaming media data to be downloaded does not satisfy the pre-download condition, the terminal further detects existence of the playing-trigger operation against the streaming media data to be downloaded. The playing-trigger operation against the streaming media data to be downloaded includes but is not limited to: a click-to-play operation of the user on a displayed playing window of the streaming media data to be downloaded, or a currently displayed page of the terminal being directed to a page containing a playing window of the streaming media data to be downloaded, or a playing window of streaming media data to be downloaded being popped up in the current display page of the terminal, and the like.

At block 205, download the streaming media data to be downloaded to a preset cache area and play the streaming media data downloaded, upon detecting that the playing-trigger operation exists.

In one implementation, if the terminal detects existence of the playing-trigger operation, download the streaming media data to be downloaded to the preset cache area in a memory space of the terminal and further play streaming media data downloaded, where the preset cache area is dedicated to caching streaming media data. In this way, it is possible to prevent the streaming media data from competing for cache resource with other downloaded contents, thereby ensuring smoothness of playing the streaming media data while downloading the streaming media data.

According to implementations of the disclosure, the playing of all current streaming media data can be further optimized in the above manner, thereby ensuring smooth playing of the streaming media data.

Figure 3:
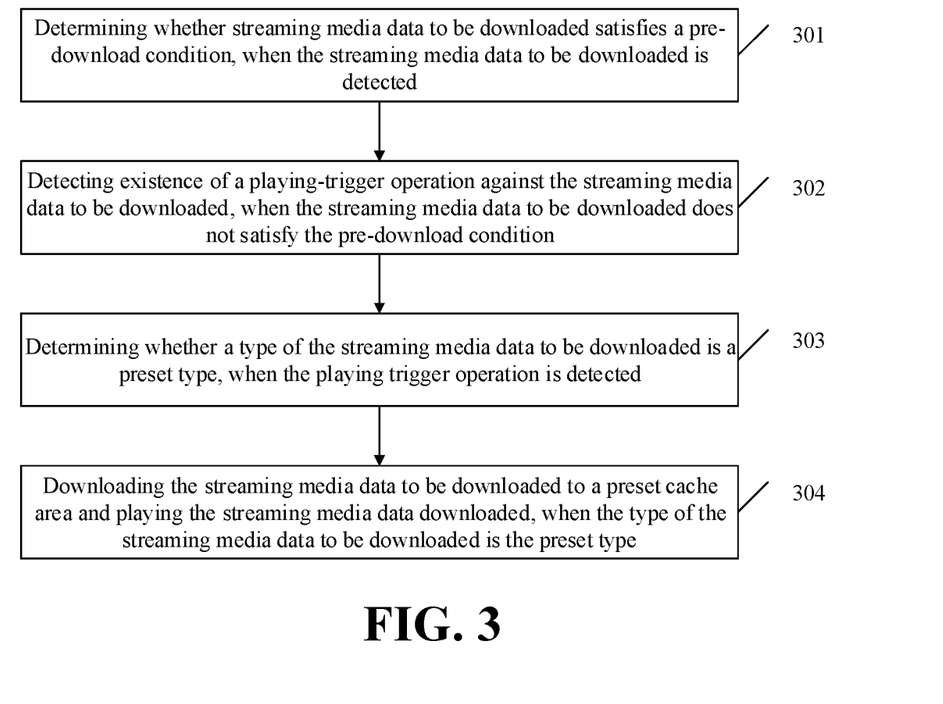
FIG. 3 is a schematic flowchart illustrating a method for processing streaming media data according to a third implementation of the disclosure.

FIG. 3 is a schematic flowchart illustrating a method for processing streaming media data according to a third implementation of the disclosure. The method can be implemented by a terminal. As illustrated in FIG. 3, the method starts at block 301. In FIG. 3, a situation where the pre-download condition is not satisfied is illustrated.

At block 301, determine whether streaming media data to be downloaded satisfies a pre-download condition, when the streaming media data to be downloaded is detected.

For operations at block 301, reference may be made to the corresponding operations in the implementations illustrated in FIG. 1, which will not be repeated herein.

At block 302, detect existence of a playing-trigger operation against the streaming media data to be downloaded, when the streaming media data to be downloaded does not satisfy the pre-download condition.

At block 303, determine whether a type of the streaming media data to be downloaded is a preset type, when the playing-trigger operation is detected.

In one implementation, after detecting that the playing-trigger operation exists, whether the type of the streaming media data to be downloaded is the preset type is further determined. The type of the streaming media data referred to herein may include at least one of a data format type of the streaming media data, a content type of the streaming media data, a protocol type of the streaming media data, and the like. For example, whether the type of the streaming media data to be downloaded is a video stream may be determined, or whether the type of the streaming media data to be downloaded is a preset content type (such as TV series or a movie) may be determined.

At block 304, download the streaming media data to be downloaded to the preset cache area and play the streaming media data downloaded, when the type of the streaming media data to be downloaded is the preset type.

In one implementation, upon determining that the type of the streaming media data to be downloaded is the preset type, the streaming media data to be downloaded may be downloaded to the preset cache area in a memory space, so as to ensure that the preset cache area caches streaming media data with a higher priority. In other words, if the type of the streaming media data to be downloaded is the preset type, the streaming media data to be downloaded has a higher priority and may be downloaded to the preset cache area. Otherwise, the streaming media data to be downloaded can be downloaded to the preset cache area only when the preset cache area is idle.

In addition, if the type of the streaming media data to be downloaded is the preset type, the terminal may further perform the following before downloading the streaming media data to be downloaded to the preset cache area. Detect whether area capacity of an available cache area in the preset cache area is smaller than the amount of data downloaded per unit time of the streaming media data to be downloaded. If yes, detect existence of other streaming media data cached in the preset cache area. Upon detecting that other streaming media data is cached in the preset cache area, compare the streaming media data to be downloaded and the other streaming media data in terms of priority. For downloading the streaming media data to be downloaded to the preset cache area, the method includes the following. The other streaming media data is cleaned up in the preset cache area and the streaming media data to be downloaded is downloaded to the preset cache area according to the amount of data downloaded per unit time, when the priority of the streaming media data to be downloaded is higher than that of the other streaming media data.

In one implementation, whether the area capacity of the available cache area in the preset cache area is smaller than the amount of data downloaded per unit time of the streaming media data to be downloaded may be determined first. If yes, it indicates that the preset cache area is unable to cache the streaming media data to be downloaded, that is, the streaming media data to be downloaded requires a larger cache space, and then existence of other streaming media data cached in the current preset cache area is further detected. Upon detecting that other streaming media data is cached in the preset cache area, the streaming media data to be downloaded and the other streaming media data are compared in terms of priority. The priority may be determined according to streaming media contents of the streaming media data, or may be determined according to a data format or a playing source of the streaming media data. For instance, if the streaming media contents of the streaming media data to be downloaded are user subscribed contents and contents in the current preset cache area are user accustomed contents, assuming that the user subscribed contents has a priority higher than the user accustomed contents, clear up the other streaming media data in the preset cache area, download the streaming media data to be downloaded to the preset cache area, and play the streaming media data downloaded. Upon detecting that the above-mentioned other streaming media data has a priority higher than the streaming media data to be downloaded, it indicates that other cache areas need to be allocated for the streaming media data to be downloaded.

Part or all of the operations in the foregoing method implementations of the disclosure may be combined, which will not be repeated herein.

The apparatus implementations of the disclosure will be described below in conjunction with the above method implementations. The terminal according to the implementation of the disclosure may be, for example, a mobile phone, a tablet computer, a notebook computer, a palmtop computer, a mobile internet device, a wearable device (such as a smart watch (such as iwatch, etc.), a smart bracelet, etc.), or other handheld devices with a touch display screen.

Figure 4:
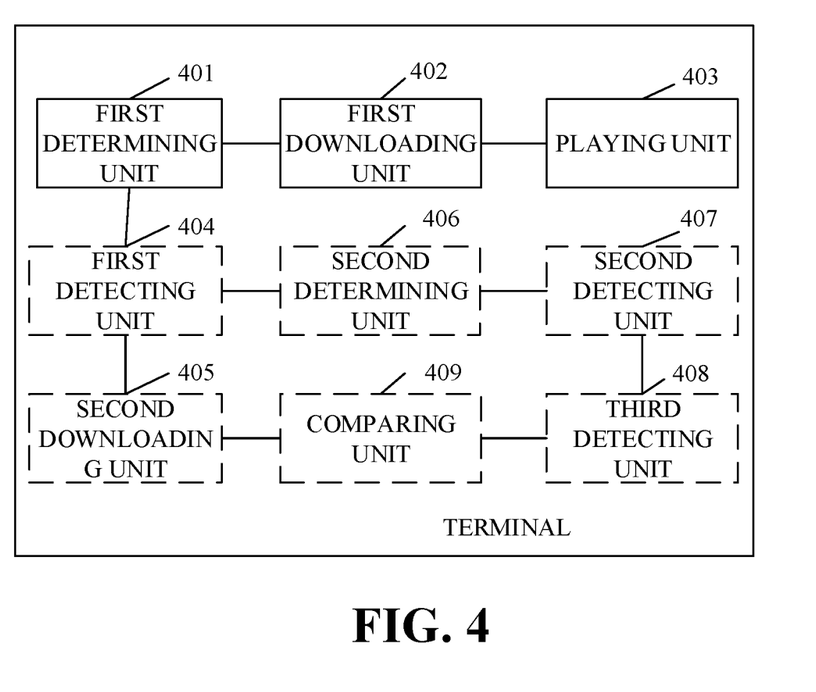
FIG. 4 is a schematic structural diagram illustrating a terminal according to an implementation of the disclosure.

FIG. 4 is a schematic structural diagram illustrating a terminal according to a first implementation of the disclosure. The terminal is configured to perform the method for processing streaming media data of implementations of the disclosure. As illustrated in FIG. 4, the terminal includes a first determining unit 401, a first downloading unit 402, and a playing unit 403. The first determining unit 401 is configured to determine whether streaming media data to be downloaded satisfies a pre-download condition, upon detecting existence of the streaming media data to be downloaded. The first downloading unit 402 is configured to download the streaming media data to be downloaded, when the first determining unit 401 determines that the streaming media data to be downloaded satisfies the pre-download condition. The playing unit 403 is configured to play streaming media data downloaded in a playing environment of the streaming media data, upon detecting the playing environment.

In one implementation, the first determining unit 401 is configured to determine whether a playing source of the streaming media data to be downloaded is a preset playing source and to determine that the streaming media data to be downloaded satisfies the pre-download condition upon determining that the playing source of the streaming media data to be downloaded is the preset playing source.

In another implementation, the first determining unit 401 is configured to acquire descriptive information on the streaming media data to be downloaded, to determine whether streaming media contents of the streaming media data to be downloaded belong to preset contents according to the descriptive information, and to determine that the streaming media data to be downloaded satisfies the pre-download condition upon determining that the streaming media contents belong to the preset contents.

In one implementation, the terminal further includes a first detecting unit 404 and a second downloading unit 405. The first detecting unit 404 is configured to detect existence of a playing-trigger operation against the streaming media data to be downloaded, when the first determining unit 401 determines that the streaming media data to be downloaded does not satisfy the pre-download condition. The second downloading unit 405 is configured to download the streaming media data to be downloaded to a preset cache area and to play the streaming media data downloaded, when the first detecting unit 404 detects that the playing-trigger operation exists.

In one implementation, the terminal further includes a second determining unit 406. The second determining unit 406 is configured to determine whether a type of the streaming media data to be downloaded is a preset type, when the first detecting unit 404 detects that the playing-trigger operation exists. The second downloading unit 405 is further configured to download the streaming media data to be downloaded to the preset cache area, when the second determining unit 406 determines that the type of the streaming media data to be downloaded is the preset type.

In one implementation, the terminal further includes a second detecting unit 407, a third detecting unit 408, and a comparing unit 409. The second detecting unit 407 is configured to detect whether area capacity of an available cache area in the preset cache area is smaller than the amount of data downloaded per unit time of the streaming media data to be downloaded, when the second determining unit 406 determines that the type of the streaming media data to be downloaded is the preset type. The third detecting unit 408 is configured to detect existence of other streaming media data cached in the preset cache area, when the second detecting unit 407 detects that the area capacity of the available cache area in the preset cache area is smaller than the amount of data downloaded per unit time of the streaming media data to be downloaded. The comparing unit 409 is configured to compare the streaming media data to be downloaded and the other streaming media data in terms of priority, when the third detecting unit 408 detects that the other streaming media data is cached in the preset cache area. The second downloading unit 405 is further configured to delete the other streaming media data from the preset cache area and to download the streaming media data to be downloaded to the preset cache area according to the amount of data downloaded per unit time, when the comparing unit 409 determines that the priority of the streaming media data to be downloaded is higher than that of the other streaming media data.

As can be seen, when the streaming media data to be downloaded is detected, whether the streaming media data to be downloaded satisfies a pre-download condition is determined. If yes, download the streaming media data to be downloaded. Upon detecting the playing environment of streaming media data downloaded, play the streaming media data in the playing environment. As such, it is possible to pre-download the streaming media data to be downloaded before playing, thus ensuring that the streaming media data can be smoothly played in time.

Figure 5:
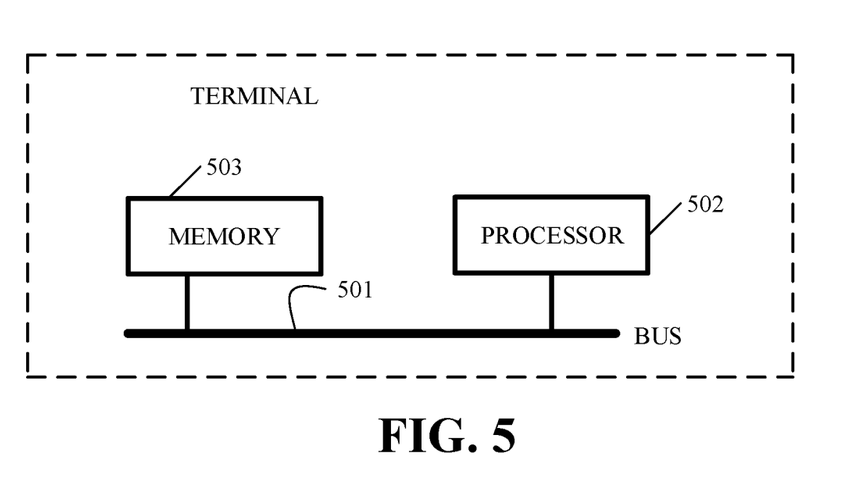
FIG. 5 is a schematic structural diagram illustrating a terminal according to another implementation of the disclosure.

FIG. 5 is a schematic structural diagram illustrating a terminal according to a second implementation of the disclosure. The terminal is configured to perform the method for processing streaming media data of implementations of the disclosure. As illustrated in FIG. 5, the terminal includes at least one bus 501, at least one processor 502 coupled to the at least one bus 501, and at least one memory 503 coupled to the at least one bus 501. The processor 502 is configured to invoke codes stored in the memory 503 via the bus 501 to perform the following. The processor 502 is configured to determine whether the streaming media data to be downloaded satisfies a pre-download condition, upon detecting existence of streaming media data to be downloaded. The processor 502 is configured to download the streaming media data to be downloaded, upon determining that the streaming media data to be downloaded satisfies the pre-download condition. The processor 502 is configured to play streaming media data downloaded in a playing environment of the streaming media data, upon detecting the playing environment.

Herein, the processor 502 is configured to perform all or part of the operations of any of the methods described in the foregoing method implementations.

In addition, the executable program codes stored in the memory 503 are configured to perform related operations of the method illustrated in FIG. 2 or FIG. 3 above, which will not be repeated herein.

Figure 6:
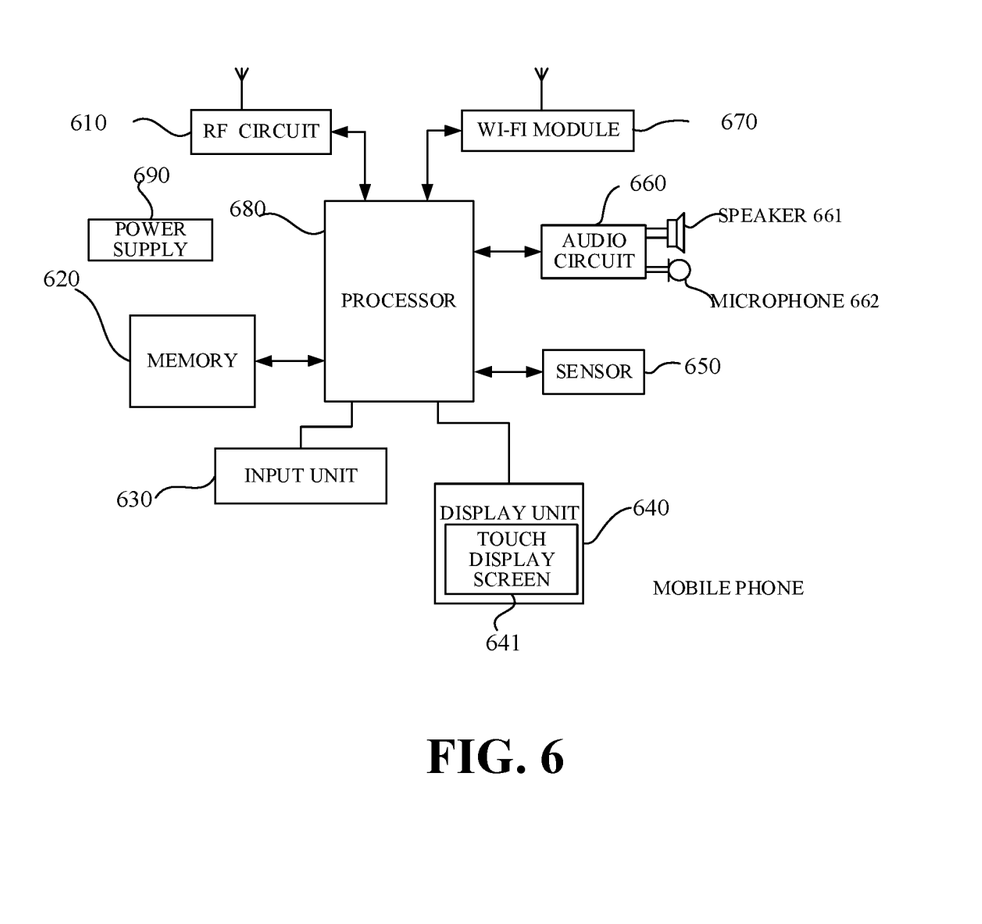
FIG. 6 is a schematic structural diagram illustrating a terminal according to yet another implementation of the disclosure.

Implementations of the disclosure also provide another terminal. As illustrated in FIG. 6, only parts related to implementations of the disclosure are illustrated for the convenience of description. For technical details not described, reference may be made to the method implementations of the disclosure. The terminal may be any terminal device, such as a mobile phone, a tablet PC, a personal digital assistant (PDA), a point of sale terminal (POS), an on-board computer, and the like. The following describes a mobile phone as an example of the terminal.

FIG. 6 is a block diagram illustrating a partial structure of a mobile phone related to a terminal according to an implementation of the disclosure. Referring to FIG. 6, the mobile phone includes a radio frequency (RF) circuit 610, a memory 620, an input unit 630, a display unit 640, a sensor 650, an audio circuit 660, a wireless fidelity (Wi-Fi) module 670, a processor 680, a power supply 690, and other components. Those skilled in the art can understand that the structure of the mobile phone illustrated in FIG. 6 does not constitute any limitation on a mobile phone. The mobile phone configured to implement technical solutions of the disclosure may include more or fewer components than illustrated, or may combine certain components, or may adopt different arrangements of components.

In the following, various components of the mobile phone will be described in detail with reference to FIG. 6.

The RF circuit 610 is configured to receive or transmit information. Generally, the RF circuit 610 includes but is not limited to an antenna, at least one amplifier, a transceiver, a coupler, a low noise amplifier (LNA), a duplexer, and the like. In addition, the RF circuit 610 may also communicate with the network or other devices via wireless communication. The wireless communication herein may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 620 is configured to store software programs and modules. The processor 680 is configured to execute various function applications and data processing of the mobile phone by running the software programs and the modules stored in the memory 620. The memory 620 may mainly include a program storage area and a data storage area. The program storage area may store an operating system, applications required for at least one function, and the like. The data storage area may store data created according to the use of the smart phone, and the like. In addition, the memory 620 may include a high-speed random access memory (RAM), and may further include a non-transitory memory such as at least one disk storage device, a flash device, or other non-transitory solid-state storage devices.

The input unit 630 is configured to receive input digital or character information and to generate key signal input associated with user setting and function control of the mobile phone. The input unit 630 may include at least one of a physical keyboard, a function key (such as a volume control key, a switch key, etc.), a trackball, a mouse, a joystick, a fingerprint identification module, and the like.

The display unit 640 is configured to display information input by a user or information provided for the user or various menus of the mobile phone. The display unit 640 may include a touch display screen 641. In an example, the display screen 641 may be in the form of a liquid crystal display (LCD), an organic light-emitting diode (OLED), and so on.

The mobile phone may further include at least one sensor 650, such as a light sensor, a motion sensor, and other sensors. The light sensor may include an ambient light sensor and a proximity sensor. The ambient light sensor may adjust brightness of the display screen 641 according to ambient lights. The proximity sensor may turn off the display screen 641 and/or backlight when the mobile phone reaches near the ear. As a kind of the motion sensor, an accelerometer sensor can detect the magnitude of acceleration in all directions (typically three axes), and when the mobile phone is stationary, the accelerometer sensor can detect the magnitude and direction of gravity; the accelerometer sensor can also be applied to applications for identifying mobile-phone gestures (such as vertical and horizontal screen switching, related games, magnetometer attitude calibration), or the accelerometer sensor can be used for vibration-recognition related functions (such as a pedometer, or a percussion) and so on. The mobile phone can also be equipped with a gyroscope, a barometer, a hygrometer, a thermometer, an infrared sensor, and other sensors, and it will not be repeated herein.

The audio circuit 660, a speaker 661, and a microphone 662 may provide an audio interface between the user and the mobile phone. The audio circuit 660 may convert the received audio data into electrical signals and transfer the electrical signals to the speaker 661; thereafter the speaker 661 converts the electrical signals into sound signals for output. On the other hand, the microphone 662 converts the received sound signals into electrical signals, which will be received and converted into audio data by the audio circuit 660 to be output to the processor 680. The audio data is then processed and transmitted by the general-purpose processor 680 via the RF circuit 610 to another mobile phone for example, or the audio data is output to the memory 620 for further processing.

Wi-Fi belongs to a short-range wireless transmission technology. With aid of the Wi-Fi module 670, the mobile phone may assist the user in E-mail receiving and sending, webpage browsing, access to streaming media, and the like. Wi-Fi provides users with wireless broadband Internet access. Although the Wi-Fi module 670 is illustrated in FIG. 6, it should be understood that the Wi-Fi module 670 is not essential to the mobile phone and can be omitted according to actual needs without departing from the essential nature of the disclosure.

The processor 680 is a control center of the mobile phone. The processor 680 is configured to connect various parts of the entire smart phone through various interfaces and lines, and to execute various functions of the smart phone and process data by running or executing software programs and/or modules stored in the memory 620 and invoking data stored in the memory 620, thereby monitoring the smart phone as a whole. In at least one example, the processor 680 may include at least one core processing unit. For example, the processor 680 can be integrated with an application processor and a modem processor, where the application processor is mainly configured to handle and maintain an operating system, a user interface, applications, and so on, and the modem processor is mainly configured to process wireless communication. It will be appreciated that the modem processor mentioned above may not be integrated into the processor 680.

The mobile phone also includes a power supply 690 (e.g., a battery) that supplies power to various components. For instance, the power supply 690 may be logically coupled to the processor 680 via a power management system to achieve management of charging, discharging, and power consumption through the power management system.

Although not illustrated, a camera, a Bluetooth module, etc. may further be included in the mobile phone, which will not be elaborated herein.

In any of the foregoing implementations illustrated in FIG. 1 to FIG. 3, each operation or method may be implemented based on the structure of the mobile phone.

In the foregoing implementations illustrated in FIG. 4, the function of each unit can be implemented based on the structure of the mobile phone.

Implementations of the disclosure also provide a non-transitory computer readable storage medium. The storage medium is configured to store executable program codes which, when executed, are operable with a processor to: determine whether streaming media data to be downloaded satisfies a pre-download condition, upon detecting existence of the streaming media data to be downloaded; download the streaming media data to be downloaded based on a determination that the streaming media data to be downloaded satisfies the pre-download condition; play streaming media data downloaded in a playing environment of the streaming media data, upon detecting the playing environment.

In one implementation, the pre-download condition includes at least one of: the streaming media data to be downloaded has a preset playing source; the streaming media data to be downloaded has preset streaming media contents; at least one of the preset playing source and the preset streaming media contents is determined according to descriptive information on the streaming media data to be downloaded.

In one implementation, in terms of determining whether the streaming media data to be downloaded satisfies the pre-download condition, the executable program codes are operable with the processor to: determine whether a playing source of the streaming media data to be downloaded is a preset playing source; determine that the streaming media data to be downloaded satisfies the pre-download condition, based on a determination that the playing source of the streaming media data to be downloaded is the preset playing source.

In another implementation, in terms of determining whether the streaming media data to be downloaded satisfies the pre-download condition, the executable program codes are operable with the processor to: acquire descriptive information on the streaming media data to be downloaded;

determine whether streaming media contents of the streaming media data to be downloaded belong to preset contents, according to the descriptive information; determine that the streaming media data to be downloaded satisfies the pre-download condition, based on a determination that the streaming media contents belong to the preset contents.

In an implementation, the executable program codes are further operable with the processor to perform the following after determining whether the streaming media data to be downloaded satisfies the pre-download condition. Detect existence of a playing-trigger operation against the streaming media data to be downloaded, based on a determination that the streaming media data to be downloaded does not satisfy the pre-download condition; download the streaming media data to be downloaded to a preset cache area and play the streaming media data, in response to detecting that the playing-trigger operation exists.

In an example, the executable program codes are further operable with the processor to perform the following before downloading the streaming media data to be downloaded to the preset cache area. Determine whether a type of the streaming media data to be downloaded is a preset type, in response to the playing-trigger operation detected. In terms of downloading the streaming media data to be downloaded to the preset cache area, the executable program codes are operable with the processor to download the streaming media data to be downloaded to the preset cache area, based on a determination that the type of the streaming media data to be downloaded is the preset type.

In another example, the executable program codes are further operable with the processor to perform the following before downloading the streaming media data to be downloaded to the preset cache area. Detect whether area capacity of an available cache area in the preset cache area is smaller than the amount of data downloaded per unit time of the streaming media data to be downloaded, based on the determination that the type of the streaming media data to be downloaded is the preset type; detect existence of other streaming media data cached in the preset cache area, in response to detecting that the area capacity of the available cache area in the preset cache area is smaller than the amount of data downloaded per unit time of the streaming media data to be downloaded; compare the streaming media data to be downloaded and the other streaming media data in terms of priority, in response to detecting that the other streaming media data is cached in the preset cache area. In terms of downloading the streaming media data to be downloaded to the preset cache area, the executable program codes are operable with the processor to delete the other streaming media data from the preset cache area and download the streaming media data to be downloaded to the preset cache area according to the amount of data downloaded per unit time, when the priority of the streaming media data to be downloaded is higher than that of the other streaming media data.

The units in all the implementations of the disclosure may be implemented by a general-purpose integrated circuit, such as a central processing unit (CPU), or an application specific integrated circuit (ASIC).

The operations in the method implementations of the disclosure may be adjusted in terms of sequence, merged, and deleted according to actual needs.

The units in the apparatus implementations of the disclosure may be combined, divided, and deleted according to actual needs.

Those of ordinary skill in the art can understand that all or part of the operations of the above methods can be completed by a computer program to instruct related hardware, and the program can be stored in a computer readable storage medium. When the program is executed, operations of the methods described above may be included. The storage medium may be a magnetic disk, an optical disk, a read-only memory (ROM), or a random access memory (RAM).

The above are only exemplary implementations of the disclosure, and the scope of the disclosure is not limited thereto. Therefore equivalent changes made according to the claims of the disclosure are still within the scope of the disclosure.

What is claimed is:

1. A method for processing streaming media data, comprising:
    determining whether streaming media data to be downloaded satisfies a pre-download condition, upon detecting existence of the streaming media data to be downloaded;
    downloading the streaming media data to be downloaded, based on a determination that the streaming media data to be downloaded satisfies the pre-download condition;
    detecting, within a preset time period, whether a playing environment of the streaming media data downloaded exists after the streaming media data to be downloaded has been downloaded, wherein the playing environment at least comprises a scenario in which a playing window of the streaming media data downloaded is displayed on a currently displayed page of a terminal or a scenario in which a playing page of the streaming media data downloaded is displayed on the terminal;
    playing the streaming media data downloaded in the playing environment of the streaming media data, upon detecting the playing environment; and
    in response to determining that no playing environment is detected, cleaning up the streaming media data downloaded and adjusting the pre-download condition for pre-downloading another streaming media data to be downloaded.

2. The method of claim 1, wherein determining whether the streaming media data to be downloaded satisfies the pre-download condition comprises:
    determining whether a playing source of the streaming media data to be downloaded is a preset playing source; and
    determining that the streaming media data to be downloaded satisfies the pre-download condition, based on a determination that the playing source of the streaming media data to be downloaded is the preset playing source.

3. The method of claim 1, wherein determining whether the streaming media data to be downloaded satisfies the pre-download condition comprises:
    acquiring descriptive information on the streaming media data to be downloaded;
    determining whether streaming media contents of the streaming media data to be downloaded belong to preset contents, according to the descriptive information; and
    determining that the streaming media data to be downloaded satisfies the pre-download condition, based on a determination that the streaming media contents belong to the preset contents.

4. The method of claim 3, wherein the preset contents comprise at least one of:
    user subscribed streaming media contents determined by a terminal, user accustomed streaming media contents determined by the terminal, and streaming media contents determined by the user.

5. The method of claim 1, wherein determining whether the streaming media data to be downloaded satisfies the pre-download condition comprises:
determining whether a playing source of the streaming media data to be downloaded is a preset playing source;
determining whether streaming media contents of the streaming media data to be downloaded are updated, based on a determination that the playing source of the streaming media data to be downloaded is the preset playing source; and
determining that the streaming media data to be downloaded satisfies the pre-download condition, based on a determination that the streaming media contents of the streaming media data to be downloaded are updated.

6. The method of claim 1, further comprising:
after determining whether the streaming media data to be downloaded satisfies the pre-download condition,
detecting existence of a playing-trigger operation against the streaming media data to be downloaded, based on a determination that the streaming media data to be downloaded does not satisfy the pre-download condition; and
downloading the streaming media data to be downloaded to a preset cache area and playing the streaming media data, in response to detecting that the playing-trigger operation exists.

7. The method of claim 6, further comprising:
prior to downloading the streaming media data to be downloaded to the preset cache area, determining whether a type of the streaming media data to be downloaded is a preset type, in response to the playing-trigger operation detected.

8. The method of claim 7, wherein downloading the streaming media data to be downloaded to the preset cache area comprises:
downloading the streaming media data to be downloaded to the preset cache area, based on a determination that the type of the streaming media data to be downloaded is the preset type.

9. The method of claim 7, further comprising:
prior to downloading the streaming media data to be downloaded to the preset cache area:
detecting whether area capacity of an available cache area in the preset cache area is smaller than the amount of data downloaded per unit time of the streaming media data to be downloaded, based on the determination that the type of the streaming media data to be downloaded is the preset type;
detecting existence of other streaming media data cached in the preset cache area, in response to detecting that the area capacity of the available cache area in the preset cache area is smaller than the amount of data downloaded per unit time of the streaming media data to be downloaded; and
comparing the streaming media data to be downloaded and the other streaming media data in terms of priority, in response to detecting that the other streaming media data is cached in the preset cache area; and
downloading the streaming media data to be downloaded to the preset cache area comprising:
deleting the other streaming media data from the preset cache area and downloading the streaming media data to be downloaded to the preset cache area according to the amount of data downloaded per unit time, when the priority of the streaming media data to be downloaded is higher than that of the other streaming media data.

10. The method of claim 9, wherein the priority is determined according to at least one of streaming media contents of the streaming media data and a data format or a playing source of the streaming media data.

11. A terminal, comprising:
a processor;
a bus; and
a memory, configured to store executable program codes and coupled with the processor via the bus; the executable program codes, when executed, being operable with the processor to:
determine whether streaming media data to be downloaded satisfies a pre-download condition, upon detecting existence of the streaming media data to be downloaded;
download the streaming media data to be downloaded based on a determination that the streaming media data to be downloaded satisfies the pre-download condition;
detect, within a preset time period, whether a playing environment of the streaming media data downloaded exists after the streaming media data to be downloaded has been downloaded, wherein the playing environment at least comprises a scenario in which a playing window of the streaming media data downloaded is displayed on a currently displayed page of the terminal or a scenario in which a playing page of the streaming media data downloaded is displayed on the terminal;
play the streaming media data downloaded in the playing environment of the streaming media data, upon detecting the playing environment; and
in response to determining that no playing environment is detected, clean up the streaming media data downloaded and adjust the pre-download condition for pre-downloading another streaming media data to be downloaded.

12. The terminal of claim 11, wherein the executable program codes operable with the processor to determine whether the streaming media data to be downloaded satisfies the pre-download condition are operable with the processor to:
determine whether a playing source of the streaming media data to be downloaded is a preset playing source; and
determine that the streaming media data to be downloaded satisfies the pre-download condition, based on a determination that the playing source of the streaming media data to be downloaded is the preset playing source.

13. The terminal of claim 11, wherein the executable program codes operable with the processor to determine whether the streaming media data to be downloaded satisfies the pre-download condition are operable with the processor to:
acquire descriptive information on the streaming media data to be downloaded;
determine whether streaming media contents of the streaming media data to be downloaded belong to preset contents, according to the descriptive information; and
determine that the streaming media data to be downloaded satisfies the pre-download condition, based on a determination that the streaming media contents belong to the preset contents.

14. The terminal of claim 11, wherein the executable program codes are further operable with the processor to:
after determining whether the streaming media data to be downloaded satisfies the pre-download condition:
detect existence of a playing-trigger operation against the streaming media data to be downloaded, based on a determination that the streaming media data to be downloaded does not satisfy the pre-download condition; and
download the streaming media data to be downloaded to a preset cache area and play the streaming media data, in response to detecting that the playing-trigger operation exists.

15. The terminal of claim 14, wherein the executable program codes are further operable with the processor to:
prior to downloading the streaming media data to be downloaded to the preset cache area, determine whether a type of the streaming media data to be downloaded is a preset type, in response to the playing-trigger operation detected.

16. The terminal of claim 15, wherein the executable program codes operable with the processor to download the streaming media data to be downloaded to the preset cache area are operable with the processor to:
download the streaming media data to be downloaded to the preset cache area, based on a determination that the type of the streaming media data to be downloaded is the preset type.

17. The terminal of claim 15, wherein the executable program codes are further operable with the processor to:
prior to downloading the streaming media data to be downloaded to the preset cache area:
detect whether area capacity of an available cache area in the preset cache area is smaller than the amount of data downloaded per unit time of the streaming media data to be downloaded, based on the determination that the type of the streaming media data to be downloaded is the preset type;
detect existence of other streaming media data cached in the preset cache area, in response to detecting that the area capacity of the available cache area in the preset cache area is smaller than the amount of data downloaded per unit time of the streaming media data to be downloaded; and
compare the streaming media data to be downloaded and the other streaming media data in terms of priority, in response to detecting that the other streaming media data is cached in the preset cache area; and
wherein the executable program codes operable with the processor to download the streaming media data to be downloaded to the preset cache area being operable with the processor to:
delete the other streaming media data from the preset cache area and download the streaming media data to be downloaded to the preset cache area according to the amount of data downloaded per unit time, when the priority of the streaming media data to be downloaded is higher than that of the other streaming media data.

18. A non-transitory computer readable storage medium, configured to store executable program codes which, when executed, are operable with a processor of a terminal to:
determine whether streaming media data to be downloaded satisfies a pre-download condition, upon detecting existence of the streaming media data to be downloaded;
download the streaming media data to be downloaded based on a determination that the streaming media data to be downloaded satisfies the pre-download condition;
detect, within a preset time period, whether a playing environment of the streaming media data downloaded exists after the streaming media data to be downloaded has been downloaded, wherein the playing environment at least comprises a scenario in which a playing window of the streaming media data downloaded is displayed on a currently displayed page of the terminal or a scenario in which a playing page of the streaming media data downloaded is displayed on the terminal;
play the streaming media data downloaded in the playing environment of the streaming media data, upon detecting the playing environment; and
in response to determining that no playing environment is detected, clean up the streaming media data downloaded and adjust the pre-download condition for pre-downloading another streaming media data to be downloaded.

19. The non-transitory computer readable storage medium of claim 18, wherein the pre-download condition comprises at least one of:
the streaming media data to be downloaded has a preset playing source;
the streaming media data to be downloaded has preset streaming media contents; and at least one of the preset playing source and the preset streaming media contents is determined according to descriptive information on the streaming media data to be downloaded.

20. The non-transitory computer readable storage medium of claim 19, wherein the executable program codes, when executed, operable with the processor to adjust the pre-download condition are operable with the processor to:
adjust the pre-download condition by adjusting the preset playing source of the streaming media data to be downloaded; or
adjust the pre-download condition by adjusting the preset streaming media contents of the streaming media data to be downloaded.

* * * * *